United States Patent
Nakaya et al.

(10) Patent No.: US 11,517,991 B2
(45) Date of Patent: Dec. 6, 2022

(54) MACHINE TOOL INCLUDING VIBRATION RESTRICTION MEANS

(71) Applicants: CITIZEN WATCH CO., LTD., Nishitokyo (JP); CITIZEN MACHINERY CO., LTD., Kitasaku-gun Nagano (JP)

(72) Inventors: Takaichi Nakaya, Higashimurayama (JP); Kazuhiko Sannomiya, Kawagoe (JP); Hiroshi Shinohara, Kawagoe (JP)

(73) Assignees: CITIZEN WATCH CO., LTD., Tokyo (JP); CITIZEN MACHINERY CO., LTD., Kitasaku-gun (JP)

(*) Notice: Subject to any disclaimer, the term of this patent is extended or adjusted under 35 U.S.C. 154(b) by 414 days.

(21) Appl. No.: 16/652,415

(22) PCT Filed: Oct. 4, 2018

(86) PCT No.: PCT/JP2018/037285
§ 371 (c)(1),
(2) Date: Mar. 31, 2020

(87) PCT Pub. No.: WO2019/073908
PCT Pub. Date: Apr. 18, 2019

(65) Prior Publication Data
US 2020/0282502 A1    Sep. 10, 2020

(30) Foreign Application Priority Data

Oct. 13, 2017  (JP) .............................. JP2017-199697

(51) Int. Cl.
*B23Q 15/013*   (2006.01)
*G05B 19/4093*  (2006.01)

(52) U.S. Cl.
CPC ....... *B23Q 15/013* (2013.01); *G05B 19/4093* (2013.01); *G05B 2219/37355* (2013.01)

(58) Field of Classification Search
None
See application file for complete search history.

(56) References Cited

U.S. PATENT DOCUMENTS

2016/0011579 A1   1/2016   Watanabe et al.

FOREIGN PATENT DOCUMENTS

| EP | 2261627 A2  | 12/2010 |
| JP | H11156601 A | 6/1999  |

(Continued)

OTHER PUBLICATIONS

Machine Translation of WO/2015/140906 (Year: 2015).*

(Continued)

*Primary Examiner* — Ryan A Jarrett
(74) *Attorney, Agent, or Firm* — Kenja IP Law PC

(57) ABSTRACT

A machine tool includes: a cutting tool; rotating means; feeding means; and vibration means for reciprocatingly vibrating the cutting tool and the workpiece relative to each other; wherein the cutting process is carried out by a relative rotation of the workpiece and the cutting tool, and feeding of the cutting tool, to thereby move the cutting tool continuously along a plurality of predetermined movement paths each having a different machining feeding direction. The machine tool further includes vibration restriction means that operates as the movement of the cutting tool changes from one movement path of two consecutive movement paths to the other movement path, for restricting the reciprocating vibration for a predetermined period from the movement starting position of the movement paths, and starting the reciprocating vibration after the lapse of said predetermined period.

3 Claims, 6 Drawing Sheets

(56) References Cited

FOREIGN PATENT DOCUMENTS

| JP | 5139591 B1    | 2/2013  |
|----|---------------|---------|
| WO | 2015140906 A1 | 9/2015  |
| WO | 2015146945 A1 | 10/2015 |
| WO | 2015162739 A1 | 10/2015 |

OTHER PUBLICATIONS

Dec. 18, 2018, International Search Report issued in the International Patent Application No. PCT/JP2018/037285.
Jun. 4, 2021, the Extended European Search Report issued by the European Patent Office in the corresponding European Patent Application No. 18865876.9.
Philips S. Ogun et al., Active vibration control and real-time cutter path modification in rotary wood planing, Mechatronics, 2017, pp. 21-31, vol. 46.
Apr. 14, 2020, International Preliminary Report on Patentability issued in the International Patent Application No. PCT/JP2018/037285.
Dec. 29, 2021, Office Action issued by the Taiwan Intellectual Property Office in the corresponding Taiwanese Patent Application No. 107135481.
Feb. 9, 2021, Notification of Reasons for Refusal issued by the Japan Patent Office in the corresponding Japanese Patent Application No. 2017-199697.

\* cited by examiner

MACHINE TOOL INCLUDING VIBRATION RESTRICTION MEANS

TECHNICAL FIELD

The present disclosure relates to a machine tool.

BACKGROUND ART

In the state of the art, there is known a machine tool that includes: a cutting tool for cutting a workpiece; rotating means for rotating the cutting tool and the workpiece relative to each other; feeding means for feeding the cutting tool and the workpiece in a predetermined machining feeding direction; and vibration means for reciprocatingly vibrating the cutting tool and the workpiece relative to each other; wherein the cutting process is carried out by a relative rotation of the workpiece and the cutting tool, and feeding of the cutting tool in the machining feeding direction of the cutting tool (refer, for example, to WO 2015/146945 A1 (PTL 1)).

It is generally known that, with a machine tool such as a lathe, cutting can be carried out by continuously moving the cutting tool relative to the workpiece along a plurality of predetermined movement paths each having a different machining feeding direction.

CITATION LIST

Patent Literature

PTL 1: WO 2015/146945 A1

SUMMARY

Technical Problem

It is an object of the present disclosure to provide a machine tool wherein the cutting process is carried out by continuously moving the cutting tool relative to the workpiece along a plurality of predetermined movement paths each having a different machining feeding direction, and wherein the machine tool operates as the movement of the cutting tool changes from one movement path of two of consecutive movement paths to the other movement path, for restricting the reciprocating vibration for a predetermined period from the movement starting position of the movement paths, and starting the reciprocating vibration after the lapse of said predetermined period.

Solution to Problem

For solving the above-mentioned problems, according to the present disclosure, there is provided a machine tool that includes: a cutting tool for cutting a workpiece; rotating means for rotating the cutting tool and the workpiece relative to each other; feeding means for feeding the cutting tool and the workpiece in a predetermined machining feeding direction; and a vibration means for relatively reciprocally vibrating the tool and the workpiece; wherein the cutting process is carried out by a relative rotation of the workpiece and the cutting tool, and feeding of the cutting tool in the machining feeding direction of the cutting tool, to thereby move the cutting tool continuously along a plurality of predetermined movement paths each having a different machining feeding direction; characterized in that the machine tool further includes vibration restriction means that operates as the movement of the cutting tool changes from one movement path of two consecutive movement paths to the other movement path, for restricting the reciprocating vibration for a predetermined period from the movement starting position of the movement paths, and starting the reciprocating vibration after the lapse of said predetermined period.

In the machine tool according to the present disclosure, with the configuration as described above, it is preferred that the movement of the cutting tool on one of the two movement paths that are continuous with each other is carried out by a feeding operation with the reciprocating vibration stopped.

In the machine tool according to the present disclosure, with the configuration as described above, it is preferred that the vibration restricting means restricts the reciprocating vibration for a predetermined time from a movement starting position of the movement path.

In the machine tool according to the present disclosure, with the configuration as described above, it is preferred that the vibration restricting means restricts the reciprocating vibration during a period in which the cutting tool moves by a vibrating width of the reciprocating vibration in the moving path from a movement starting position of the moving path.

Advantageous Effect

According to the structure of the machine tool of the present disclosure configured as described above, the cutting process is carried out by moving the cutting tool continuously along a plurality of predetermined movement paths each having a different machining feed direction, and the vibration restriction means operates as the movement of the cutting tool changes from one movement path of two consecutive movement paths to the other movement path, for restricting the reciprocating vibration for a predetermined period from the movement starting position of the movement paths, and starting the reciprocating vibration after the lapse of said predetermined period to thereby provide an advantageous effect that the reciprocating vibration can be suppressed at the movement starting position of the movement path.

DETAILED DESCRIPTION

Figure 1:
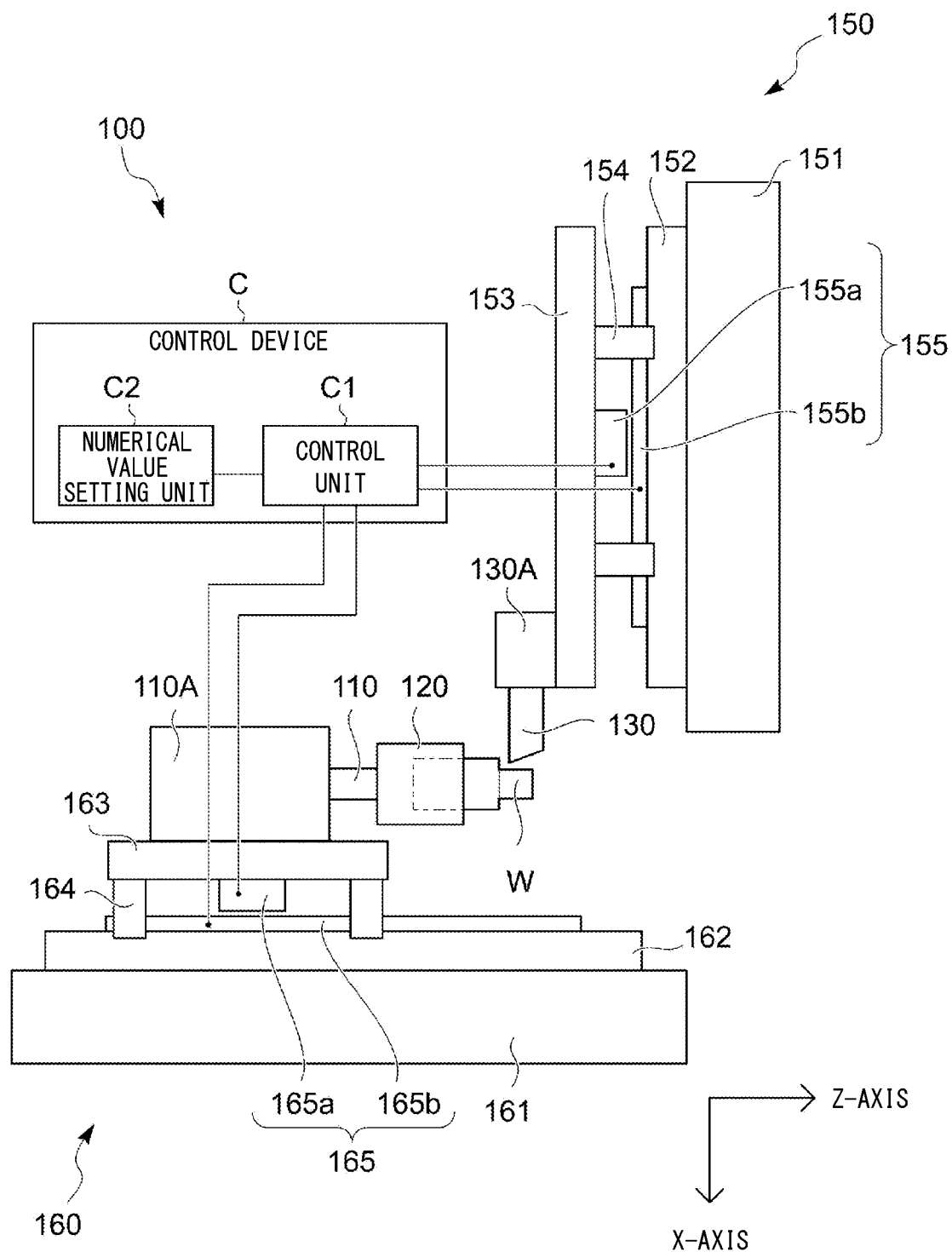
FIG. 1 illustrates the outline of the machine tool according to one embodiment of the disclosure.

The machine tool 100 includes a spindle 110 and a cutting tool rest 130A, as illustrated in FIG. 1.

The spindle 110 has a tip provided with a chuck 120.

The spindle 110 is configured as a workpiece holder unit for holding a workpiece W, and the workpiece W is held on the spindle 110 via the chuck 120.

The cutting tool rest 130A is configured as a tool rest for holding a cutting tool 130, such as a cutting tool for turning a workpiece W, and the cutting tool 130 is mounted on the cutting tool rest 130A.

The spindle 110 is supported by a headstock 110A such that it can be driven for rotation by the power of a spindle motor.

The spindle motor may be in the form of a conventionally known built-in motor arranged between the headstock 110A and the spindle 110 in the headstock 110A.

The headstock 110A is mounted on the bed side of the machine tool 100 via a Z-axis direction feeding mechanism 160.

The Z-axis direction feeding mechanism 160 includes a base 161 integrated with the fixed side, such as the bed described above, of the Z-axis direction feeding mechanism 160, and a Z-axis guide rail 162 provided on the base 161 to extend in the Z-axis direction that is the axial direction of the spindle 110.

A Z-axis direction feeding table 163 is slidably supported on the Z-axis guide rail 162 via a Z-axis guide 164.

A mover 165a of a linear servomotor 165 is provided on the side of the Z-axis direction feeding table 163.

A stator 165b of the linear servomotor 165 is provided on the base 161 side.

By driving the linear servomotor 165, the Z-axis direction feeding table 163 is driven to move in the Z-axis direction.

The headstock 110A is mounted on the Z-axis direction feeding table 163.

By means of the movement of the Z-axis direction feeding table 163, the headstock 110A moves in the Z-axis direction to move the spindle 110 in the Z-axis direction.

The spindle 110 is provided integrally with the headstock 110A sand is movable in the Z-axis direction by a Z-axis direction feeding mechanism 160, such that the Z-axis direction feeding mechanism 160 moves the spindle 110 in the Z-axis direction as a spindle moving mechanism.

An X-axis direction feeding mechanism 150 is provided on the bed side of the machine tool 100.

The X-axis direction feeding mechanism 150 includes a base 151 integrated with the bed side, and an X-axis guide rail 152 vertically extending in the X-axis direction perpendicular to the Z-axis direction.

The X-axis guide rail 152 is fixed to the base 151, and an X-axis direction feeding table 153 is slidably supported on the X-axis guide rail 152 via an X-axis guide 154.

The cutting tool stand 130A is mounted on the X-axis direction feeding table 153.

A mover 155a of a linear servomotor 155 is provided on the X-axis direction feeding table 153 side.

A stator 155b of the linear servomotor 155 is provided on the base 151 side.

When the linear servomotor 155 is driven to move the X-axis direction feeding table 153 in the X-axis direction along the X-axis guide rail 152, the cutting tool base 130A is moved in the X-axis direction and the cutting tool 130 is thereby moved in the X-axis direction.

The X-axis direction feeding mechanism 150 serves as a tool rest moving mechanism for moving the cutting tool stand 130A in the X-axis direction integrally with the cutting tool 130.

The tool rest moving mechanism (the X-axis direction feeding mechanism 150) and the spindle moving mechanism (the Z-axis direction feeding mechanism 160) cooperate with each other such that, by means of the movement of the tool rest moving mechanism 130A (the cutting tool 130) by the X-axis direction feeding mechanism 150, in combination with the movement of the headstock 110A (the spindle 110) in the Z-axis direction by the Z-axis direction feeding mechanism 160, the cutting tool 130 is fed in any desired machining feeding direction relative to the workpiece W.

It is noted ted that there may be provided a Y-axis direction feeding mechanism for the Y-axis direction that is perpendicular to the Z-axis direction and the X-axis direction.

The Y-axis direction feeding mechanism may have a structure similar to the X-axis direction feeding mechanism 150.

The X-axis direction feeding mechanism 150 may be mounted on the bed via the Y-axis direction feeding mechanism, such that the Y-axis direction feeding table is moved in the Y-axis direction by driving a linear servomotor, and the cutting tool table 130A is moved in the Y-axis direction in addition to the X-axis direction, for moving the cutting tool 130 in the X-axis direction and the Y-axis direction.

In this instance, the tool rest moving mechanism is constituted by the X-axis direction feeding mechanism 150 and the Y-axis direction feeding mechanism, and the tool rest moving mechanism and the spindle moving mechanism cooperate with each other such that the cutting tool 130 mounted on the cutting tool rest 130A can be moved relative to the workpiece W in the Y-axis direction in addition to the X-axis direction and the Z-axis direction, and is relatively moved and fed in any desired machining feeding direction.

The Y-axis direction feeding mechanism may be mounted on the bed via the X-axis direction feeding mechanism 150, and the cutting tool table 130A may be mounted on the Y-axis direction feeding table.

Figure 2:
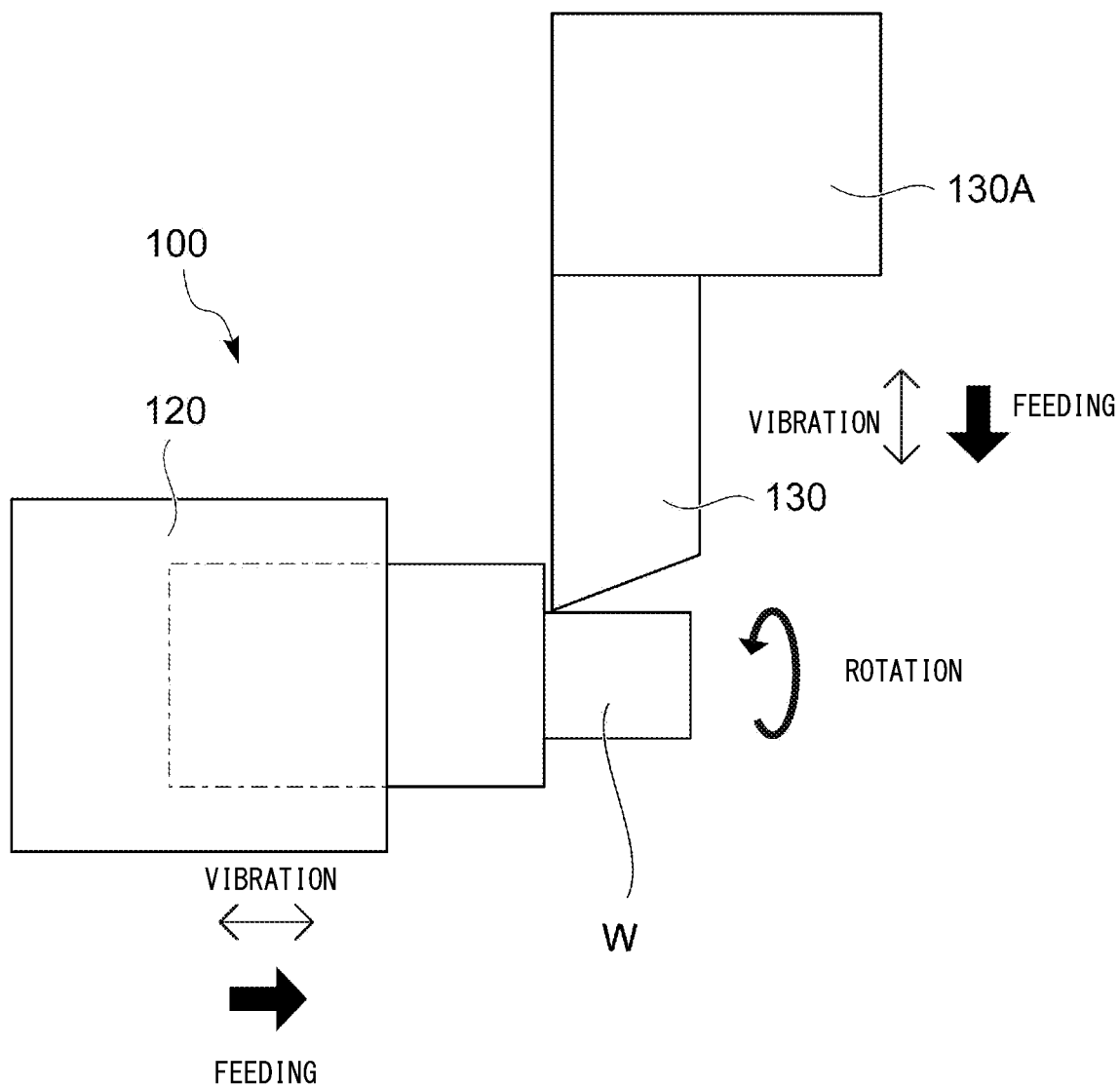
FIG. 2 illustrates the relationship between the cutting tool and the workpiece according to one embodiment of the disclosure.

The spindle moving mechanism and the tool rest moving mechanism constitute a feeding means that serves to move the spindle 110 and the cutting tool rest 130A relative to each other, to move the cutting tool 130 in any desired cutting feed direction relative to the workpiece W, and to drive the spindle 110 as the rotating means for rotating the workpiece W and the cutting tool 130 relative to each other and thereby rotate the workpiece W relative to the cutting tool 130, such that the workpiece W can be machined by the cutting tool 130 into any desired shape, as illustrated in FIG. 2.

The present embodiment is configured such that both the headstock 110A and the cutting tool rest 130A are moved, though the headstock 110A may be fixedly secured to the bed side of the machine tool 100, and the tool rest moving mechanism may be configured to move the cutting tool table 130A in the X-axis direction, the Z-axis direction or the Y-axis direction.

In this instance, the feeding means is constituted by the tool rest moving mechanism for moving the cutting tool rest 130A in the X-axis direction, the Z-axis direction or the Y-axis direction, such that the cutting tool 130 carries out a free machining feeding operation relative to the workpiece W by moving the cutting tool table 130A.

The spindle moving mechanism may be configured such that the cutting tool rest 130A is fixedly secured to the bed side of the machine tool 100 and the headstock 110A is moved in the X-axis direction, the Z-axis direction or the Y-axis direction.

In this instance, the feeding means is constituted by the headstock moving mechanism for moving the headstock 110A in the X-axis direction, the Z-axis direction, or the Y-axis direction, and the spindle table 110A is moved relative to the fixedly positioned cutting tool table 130A such that the cutting tool 130 can be moved relative to the workpiece W and fed for machining.

In the present embodiment, the X-axis direction feed mechanism 150, the Y-axis direction feed mechanism, and the Z-axis direction feed mechanism 160 are configured to be driven by a linear servomotor, though the driving mechanism may be comprised of a ball-screw and a servomotor that are known, per se.

In the present embodiment, the rotating means for relatively rotating the workpiece W and the cutting tool 130 is comprised of a spindle motor in the form of a built-in motor or the like, and the relative rotation of the workpiece W and the cutting tool 130 is achieved by driving the spindle 110 for rotation.

The present embodiment is configured such that the workpiece W is rotated with respect to the cutting tool 130, though the configuration may be such that the cutting tool 130 is rotated with respect to the workpiece W.

In this instance, as the cutting tool 130, there may be used a rotary tool, such as a drill.

The rotation of the spindle 110, as well as the movement of the X-axis direction feeding mechanism 150, the Z-axis direction feeding mechanism 160 and the Y-axis direction feeding mechanism and the like, are controlled by a control device C.

The control device C includes a control unit C1 that serves to control the rotation of the spindle 110, the movement of the Z-axis direction feed mechanism 160, the X-axis direction feed mechanism 150 or the Y-axis direction feed mechanism.

The control unit C1 carries out the control such that each feed mechanism functions as a vibrating means and the headstock 110A or the cutting tool table 130A is moved in the respective direction while each feeding mechanism is reciprocatingly vibrated in the corresponding movement direction.

Figure 3:
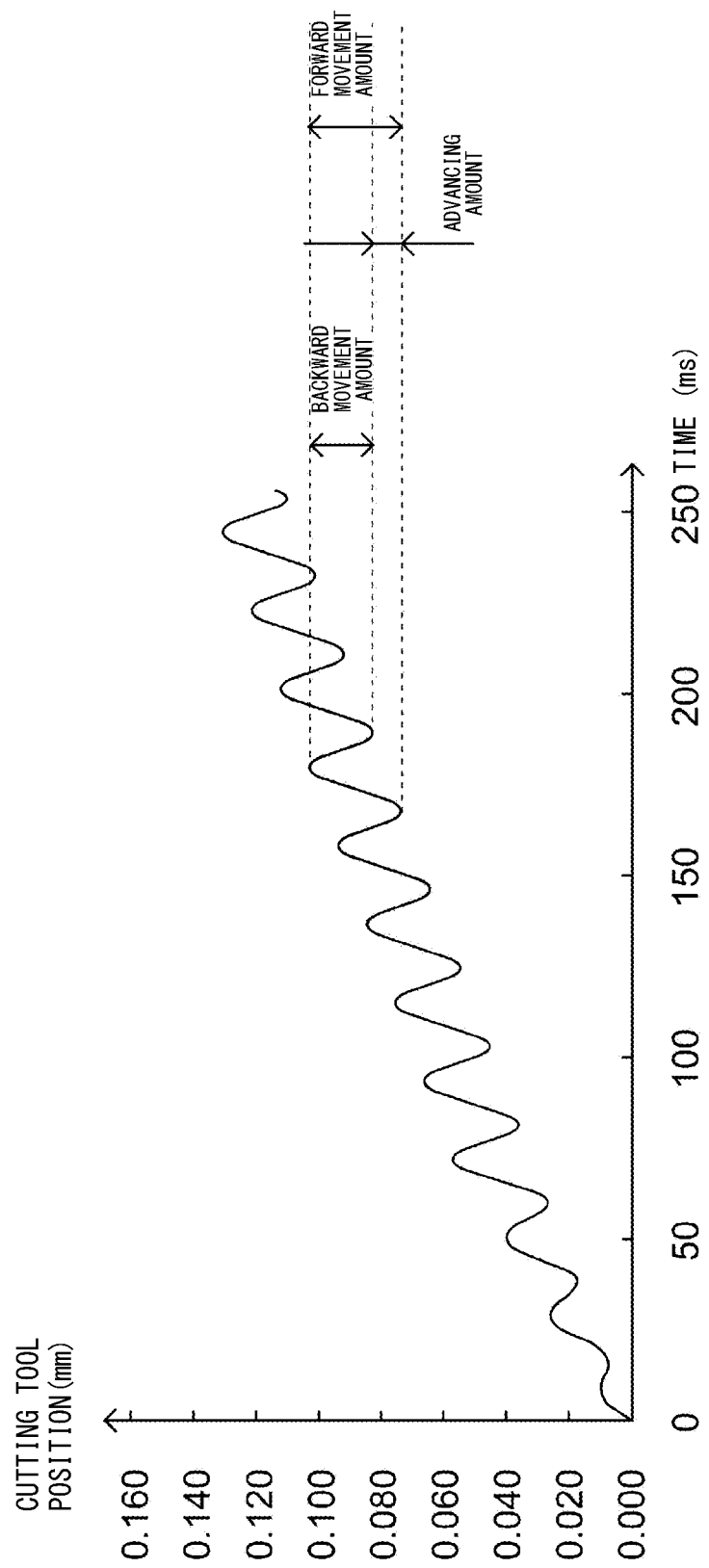
FIG. 3 illustrates the reciprocating vibration and the position of the cutting tool according to one embodiment of the disclosure.

Under the control of the control unit C1, as illustrated in FIG. 3, each feed mechanism upon one reciprocating vibration cycle moves the spindle 110 or the cutting tool rest 130A forward by a predetermined forward movement amount (forward movement) and then backward by a predetermined backward movement amount (backward movement), thereby moving it by an advancing amount that is the difference between the forward movement amount and the backward movement amount.

By the cooperation of the respective feeding mechanisms under the control of the control unit C1, the feeding means causes the cutting tool 130 to reciprocatingly vibrate in the machining feeding direction relative to the workpiece W and moves and feed it in the machining feeding direction while advancing by a predetermined advancing amount.

The cutting tool 130 is fed by the feeding means in the machining feeding direction while reciprocatingly vibrating along the machining feeding direction such that the workpiece W is machined with the sum of the advancing amounts from 0° to 360° of the spindle phase angle as the feed amount.

Figure 4:
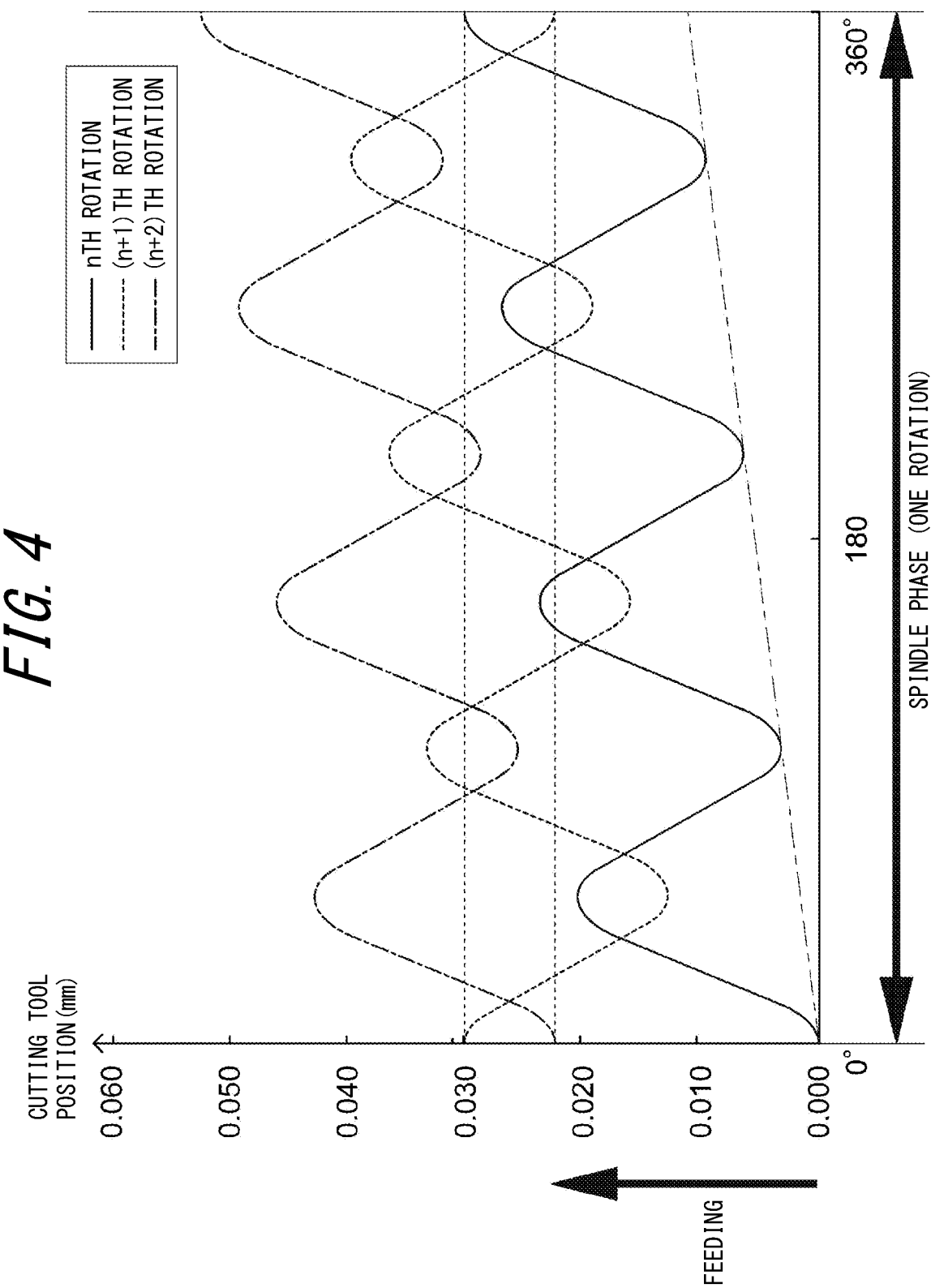
FIG. 4 illustrates the relationship of the main-axis $n^{th}$ rotation, $(n++1)^{th}$ rotation and $(n+2)^{th}$ rotation of the spindle according to one embodiment of the disclosure.

By the feeding of the cutting tool 130 with the feeding means, for example, the workpiece W is subjected to machining into a predetermined shape and the outer peripheral surface of the workpiece W is thereby cut in a wavy shape as illustrated in FIG. 4.

As illustrated in FIG. 4, assuming that the number of vibrations of the cutting tool 130 per one rotation of the workpiece W is the vibration frequency N, if the vibration frequency N is 3.5 (the vibration frequency N=3.5), then the phase of the peripheral surface shape of the workpiece W turned by the cutting tool 130 at the $(n+1)^{th}$ rotation (n is an integer of 1 or more) is opposite to the phase of the shape turned by the cutting tool 130 at the $n^{th}$ rotation.

As a result, the cut portion upon the forward movement of the cutting tool 130 at the $n^{th}$ rotation and the cutting portion upon the backward movement at the $(n+1)^{th}$ rotation partially overlap.

Since the cut portion of the peripheral surface of the workpiece at the $(n+1)^{th}$ rotation includes a portion already cut at the $n^{th}$ rotation, the cutting tool 130 does not perform any cutting on the workpiece W during cutting in this portion thereby causing a swing-and-miss motion.

Chips generated from the workpiece W during the cutting process are sequentially broken by the above-mentioned swing-and-miss motion.

The machine tool 100 can smoothly carry out the outer shape cutting of the workpiece W while breaking the chips by the reciprocating vibration of the cutting tool 130 along the machining feeding direction.

When sequentially breaking chips by the reciprocating vibration of the cutting tool 130, what is necessary is only that the cut portion at the $(n+1)^{th}$ rotation on the peripheral surface of the workpiece includes a portion already cut at the $n^{th}$ rotation.

In other words, it is sufficient if the trajectory of the cutting tool 130 upon the backward movement at the $(n+1)^{th}$ rotation of the workpiece peripheral surface reaches the position of the trajectory of the cutting tool 130 at the $n^{th}$ rotation of the workpiece peripheral surface.

As illustrated in FIG. 4, the phases of the shapes to be turned by the cutting tool 130 on the workpiece W at the $(n+1)^{th}$ rotation and at the $n^{th}$ rotation should need not be the same (the same phase), and it is not always necessary for the phases to be inverted by 180°.

Figure 5A:
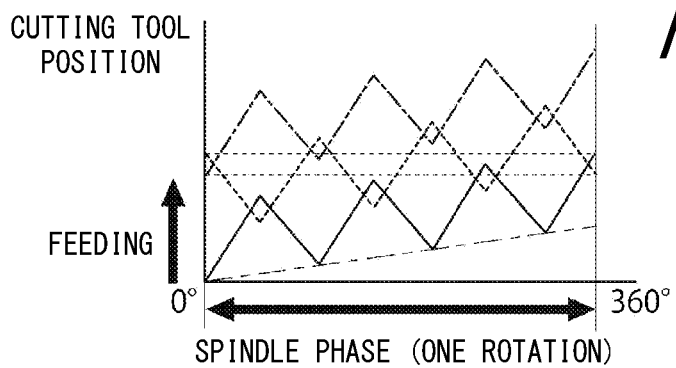
FIG. 5A illustrates the relationship between the feeding amount and the amplitude according to one embodiment of the disclosure.

As illustrated in FIG. 5A, similarly to FIG. 4, it is assumed that the cutting tool 130 vibrates 3.5 times per one rotation of the spindle, and the cutting portion at the time of the forward movement of the cutting tool 130 and the cutting portion at the time of the backward movement are partially overlapping such that the cut portion upon the second rotation of the peripheral surface of the workpiece W includes the portion already cut upon the first rotation and the swing-and-miss operation of the cutting tool 130 as described above takes place during the cutting. From this state, if the feeding amount is simply increased, as illustrated in FIG. 5B, the trajectory of the cutting tool 130 at the time of the backward movement in the $2^{nd}$ rotation does not reach the trajectory of the cutting tool 130 in the $1^{st}$ rotation, with the result that the chips may not be broken.

Figure 5B:
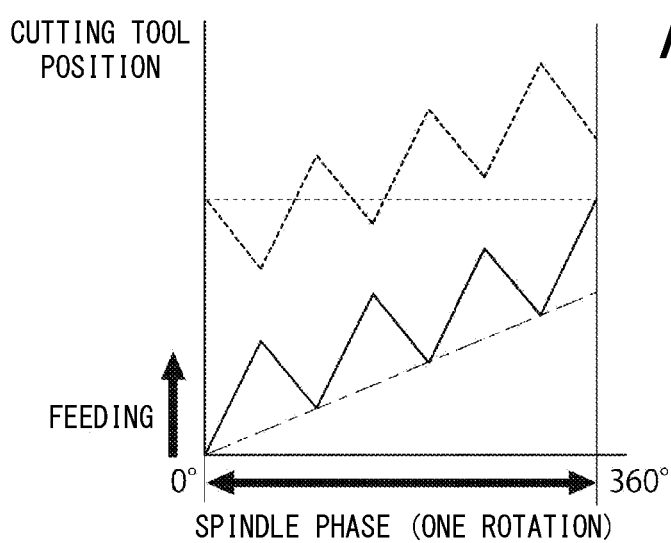
FIG. 5B illustrates the relationship between the feeding amount and the amplitude according to one embodiment of the disclosure.
Figure 5C:
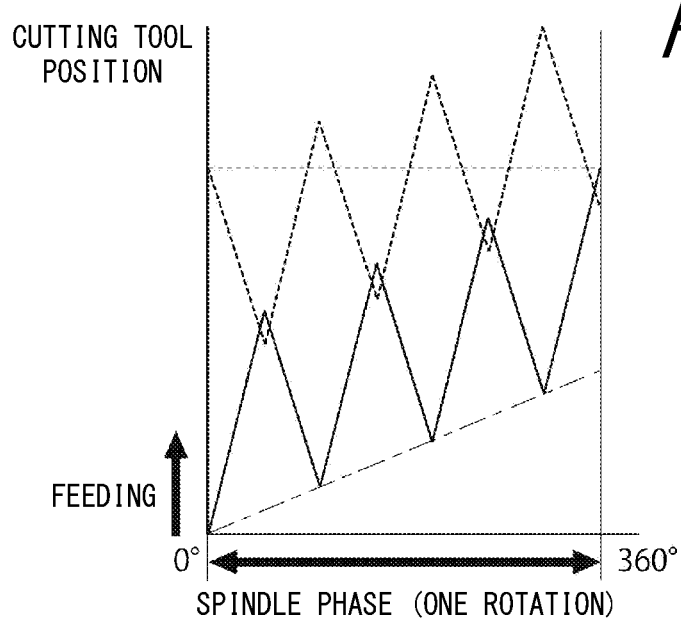
FIG. 5C illustrates the relationship between the feeding amount and the amplitude according to one embodiment of the disclosure.

In FIGS. 5A to 5C, the vibration of the cutting tool 130 is represented by straight lines for easy understanding.

If the feeding amount is simply gradually increased, the overlapping portion of the cutting portion of the cutting tool 130 at the time of the forward movement and the cutting portion of the cutting tool 130 at the time of the backward movement as described above gradually decreases.

Hence, there may be instances where the cutting portion at the time of the forward movement and the cutting portion at the time of the backward movement are not overlapped with each other, with the result that the swing-and-mis operation as described above cannot be performed with the result that the chips are not broken.

The control unit C1 includes an amplitude setting unit for setting the amplitude of the reciprocating vibration proportionally to the feeding amount of the cutting tool 130 relative to the workpiece W.

The amplitude setting means is configured to set the amplitude by multiplying the feeding amount by the amplitude feed ratio, with the ratio of the amplitude to the feeding amount as the amplitude/feeding ratio.

The amplitude/feeding ratio may be set in the control unit C1 by the user, via a numerical value setting unit C2 and the like.

The amplitude setting means and the vibration means cooperate with each other and, as illustrated in FIG. 5C, serves to set the reciprocating vibration of the cutting tool 130 along the machining feeding direction and the amplitude according to the feeding amount set for the cutting process. The control unit C1 thereby controls the vibrating means such that the trajectory of the cutting tool 130 at the time of the backward movement upon the second rotation of the workpiece W reaches the trajectory of the cutting tool 130 upon the first rotation of the workpiece W.

As a result, the amplitude is set according to the feeding amount, and the vibrating means vibrates the cutting tool 130 so as to cause the above-described swing-and-miss operation under the control of the control unit C1, thereby breaking the chips.

The cutting process by means of the feeding of the cutting tool 130 is carried out by providing a moving instruction to the control unit C1 for moving the cutting tool 130 to a predetermined coordinate position.

For example, the cutting tool 130 located at a predetermined coordinate position with respect to the workpiece W, i.e., the movement starting position, may be moved to a coordinate position designated by the moving instruction as the arrival position along an interpolation path based on the predetermined interpolation method as the moving path. In this instance, the cutting tool 130 is fed along a path connecting the two coordinate positions by the interpolation path such that the workpiece W is cut into a shape connecting the two coordinate positions by the interpolation path.

Thus, if the cutting tool 130 is moved between the two coordinate positions along a linear interpolation path, then the workpiece W is machined into a linear shape between the two coordinate positions.

On the other hand, if the cutting tool 130 is moved between the two coordinate positions along an arcuate interpolation path having a predetermined radius, then the workpiece W is machined into an arcuate shape between the two coordinate positions.

Figure 6:
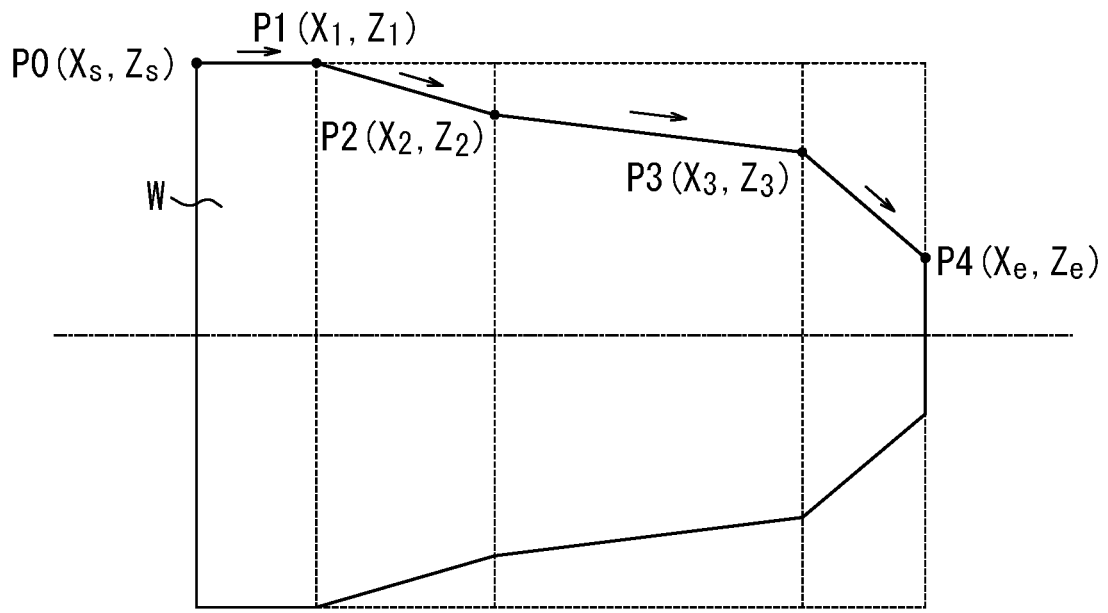
FIG. 6 illustrates the state in which the cutting tool is moved continuously along a plurality of interpolation paths.

As illustrated in FIG. 6, the control unit C1 according to the present embodiment serves to continuously move the cutting tool 130 along the plurality of interpolation paths such that the cutting tool 130 is moved along the plurality of interpolation paths that are continuously connected to carry out the cutting process on workpiece W.

FIG. 6 illustrates an example where the cutting tool 130 is moved continuously along a first interpolation path from P0 (Xs, Zs) to P1 (X1, Z1), a second interpolation from P1 (X1, Z1) to P2 (X2, Z2), a third interpolation path from P2 (X2, Z2) to P3 (X3, Z3), and a fourth interpolation path from P3 (X3, Z3) to P4 (X4, Z4).

The control unit C1 functions as a vibration restricting means for restricting the reciprocating vibration as the movement of the cutting tool 130 by means of the feeding switches from the movement along one interpolation path to the movement along the other interpolation path, such that the cutting tool 130 is moved without reciprocating vibration for a predetermined time from the movement starting position.

However, after the predetermined time has elapsed, the control unit C1 carries out the feeding with the reciprocating vibration, such that the cutting tool 130 carries out the cutting process on the workpiece W by the feeding with reciprocating vibration along the interpolation path.

By stopping the reciprocating vibration, the cutting tool 130 is continuously moved in one direction sequentially from the movement starting position of the interpolation path to the arrival position, and the portion of the workpiece that has been subjected to cutting is sequentially increased with time from the movement starting position only by the forward movement of the cutting tool, without carrying out backward movement from the arrival position toward the movement starting position.

The cutting tool 130 can carry out cutting process corresponding to the amplitude of the reciprocating vibration in the interpolation path, by the feeding without reciprocating vibration for the predetermined time after the movement starting position.

By the feeding of the cutting tool 130 without reciprocating vibration, the control unit C1 restricts the reciprocating vibration until the time elapses for the cutting tool 130 fed without reciprocating vibration to complete the cutting corresponding to the amplitude of the reciprocating vibration in the interpolation path.

When the cutting tool 130 is switched from the movement along one interpolation path of two consecutive interpolation paths to the movement along the other interpolation path due to restriction of reciprocating vibration by the vibration regulating means, unnecessary cutting by the backward movement of the reciprocating vibration in the direction from the movement starting position of the interpolation path beyond the movement starting position is prevented, and irregularity of the cutting shape can be prevented to improve the machining accuracy.

In the entirety of the one interpolation path of the two consecutive interpolation paths, as the cutting tool 130 is sequentially fed in one direction continuously from the movement starting position to the arrival position along the interpolation path without reciprocating vibration, the restriction of the reciprocating vibration by the vibration restricting means can be carried out during the machining in the consecutive interpolation paths.

Since the vibration amplitude of the backward movement at the maximum causes unnecessary cutting in the direction beyond the movement starting position, the vibration restricting means may be configured to restrict the reciprocating vibration until the time for cutting by the vibration amplitude of the backward movement elapses The control unit C1 may be provided with an amplitude control means for controlling the reciprocating vibration of the cutting tool 130 such that, upon starting of cutting from the movement starting position of the interpolation path, the amplitude of the reciprocating vibration of the cutting tool 130 is sequentially increased up to a predetermined vibration amplitude from an amplitude smaller than a predetermined vibration amplitude as determined by the amplitude/feeding ratio.

In this instance, the vibration restricting means may be configured to restrict the reciprocating vibration until elapse of a time for carrying out cutting of unnecessary cutting amount in the direction beyond the movement starting position as determined by the moving amount toward the arrival position of the cutting tool 130 in combination with the sequentially increased vibration amplitude on the backward movement side of the reciprocating vibration.

The vibration restricting means may be configured such that, when the movement is switched from the movement along one interpolation path of the two consecutive interpolation paths to the movement along the other interpolation path, the cutting is carried out independently of the predetermined time from the movement starting position of the interpolation path, by calculating the vibration amplitude of the backward movement beyond the movement starting position and restricting the reciprocating vibration based on the calculated vibration amplitude.

The control unit C1 functions as the vibration restricting means when the feeding (movement) of the cutting tool 130 is switched from one interpolation path of the two consecutive interpolation paths to the other interpolation path as described above, for restricting the reciprocating vibration for the predetermined period from the movement starting position of the interpolation path, and starting the reciprocating vibration after the elapse of the predetermined period.

The restriction of the reciprocating vibration may be carried out by setting the amplitude/feeding ratio to 0, for example.

By setting the amplitude/feeding ratio to 0 or the like, it is possible to set the divisional interpolation paths for carrying out cutting with the reciprocal vibration stopped.

However, the unnecessary cutting beyond the movement starting position may be prevented by using the movement starting position of the interpolation path as an inflection point for switching from the backward movement to the forward movement of the reciprocating vibration along the feeding direction.

The invention claimed is:

1. A machine tool comprising; a cutting tool for cutting a workpiece; rotating means for rotating the cutting tool and the workpiece relative to each other; feeding means for feeding the cutting tool and the workpiece in a predetermined machining feeding direction; and a vibration means for relatively reciprocally vibrating the tool and the workpiece;
   wherein the cutting process is carried out by a relative rotation of the workpiece and the cutting tool, and feeding of the cutting tool in the machining feeding direction of the cutting tool, to thereby move the cutting tool continuously along a plurality of predetermined movement paths each having a different machining feeding direction;
   wherein the machine tool further includes vibration restriction means that operates as the movement of the cutting tool changes from one movement path of two consecutive movement paths to the other movement path, for restricting the reciprocating vibration for a predetermined period from a movement starting position of the one moving path of the two consecutive movement paths, and starting the reciprocating vibration after the lapse of said predetermined period, and
   wherein the movement of the cutting tool on the one moving path of the two consecutive movement paths is carried out by a feeding operation with the reciprocating vibration stopped.

2. The machine tool according to claim 1, wherein the vibration restricting means restricts the reciprocating vibration for a predetermined time from the movement starting position of the one moving path of the two consecutive movement paths.

3. The machine tool according to claim 1, wherein the vibration restricting means restricts the reciprocating vibration during a period in which the cutting tool moves by a vibrating width of the reciprocating vibration in the moving path from the movement starting position of the one moving path of the two consecutive moving paths.

* * * * *